(12) United States Patent
Rosenblad

(10) Patent No.: US 8,837,170 B2
(45) Date of Patent: Sep. 16, 2014

(54) PASSIVE RESONANT BIDIRECTIONAL CONVERTER WITH GALVANIC BARRIER

(71) Applicant: Busek Co., Inc., Natick, MA (US)

(72) Inventor: Nathan S Rosenblad, Quincy, MA (US)

(73) Assignee: Busek Company, Natick, MA (US)

( * ) Notice: Subject to any disclaimer, the term of this patent is extended or adjusted under 35 U.S.C. 154(b) by 87 days.

(21) Appl. No.: 13/712,175

(22) Filed: Dec. 12, 2012

(65) Prior Publication Data

US 2013/0148382 A1 Jun. 13, 2013

Related U.S. Application Data

(60) Provisional application No. 61/630,507, filed on Dec. 13, 2011.

(51) Int. Cl.
*H02M 3/335* (2006.01)
*H02M 3/338* (2006.01)
*H02J 7/00* (2006.01)

(52) U.S. Cl.
CPC ........ *H02M 3/33523* (2013.01); *Y02B 70/1433* (2013.01); *H02M 3/33584* (2013.01); *H02M 3/3382* (2013.01); *H02J 7/0016* (2013.01)
USPC .......................................................... 363/16

(58) Field of Classification Search
USPC ................. 363/16, 17, 65, 123–125, 178
See application file for complete search history.

(56) References Cited

U.S. PATENT DOCUMENTS

| 7,706,154 B2* | 4/2010 | Chen et al. ...................... 363/17 |
| 7,796,406 B2* | 9/2010 | Lev ............................... 363/21.02 |
| 2013/0039104 A1* | 2/2013 | Sharma ........................... 363/123 |

* cited by examiner

*Primary Examiner* — Adolf Berhane
*Assistant Examiner* — Yemane Mehari
(74) *Attorney, Agent, or Firm* — Iandiorio Teska & Coleman, LLP

(57) ABSTRACT

A passive resonant bidirectional converter system that transports energy across a galvanic barrier includes a converter using at least first and second converter sections, each section including a pair of transfer terminals, a center tapped winding; a chopper circuit interconnected between the center tapped winding and one of the transfer terminals; an inductance feed winding interconnected between the other of the transfer terminals and the center tap and a resonant tank circuit including at least the inductance of the center tap winding and the parasitic capacitance of the chopper circuit for operating the converter section at resonance; the center tapped windings of the first and second converter sections being disposed on a first common winding core and the inductance feed windings of the first and second converter sections being disposed on a second common winding core for automatically synchronizing the resonant oscillation of the first and second converter sections and transferring energy between the converter sections until the voltage across the pairs of transfer terminals achieves the turns ratio of the center tapped windings.

48 Claims, 7 Drawing Sheets

Bi-directional Power Converter

Bi-directional Power Converter

US 8,837,170 B2

PASSIVE RESONANT BIDIRECTIONAL CONVERTER WITH GALVANIC BARRIER

RELATED APPLICATIONS

This application claims benefit of and priority to U.S. Provisional Application Ser. No. 61/630,507 filed Dec. 13, 2011 under 35 U.S.C. §§119, 120, 363, 365, and 37 C.F.R. §1.55 and §1.78 incorporated herein by this reference.

GOVERNMENT RIGHTS

This invention was made with U.S. Government support under Contract No. NNX10CA12C awarded by NASA. The Government may have certain rights in the subject invention.

FIELD OF THE INVENTION

This invention relates to an improved converter and more particularly to a passive resonant bidirectional converter system that transports energy across a galvanic barrier, and to such a converter system applicable e.g., as a balanced charging converter or voltage mirror.

BACKGROUND OF THE INVENTION

Battery banks are storage devices that store potential electrical energy in a chemical form. Battery banks are available as two types: rechargeable and non-rechargeable. Traditional rechargeable chemistries are lead acid, NiCd, Nimh, $NiH_2$, and AgO—Zn. New promising battery chemistries are Li—ION, Li-POLY, Li—$FePO_4$, as well as EDLC supercapacitors. The storage banks are typically created by connecting multiple low voltage storage cells in series to produce the required terminal voltage. Slight differences in manufacturing and temperature of each of the storage cells can over time lead to cell voltage mismatches in the stack. The traditional battery cell chemistries by nature are self balancing: modest overcharging of one cell is dissipated by heat allowing the others in the series stack to catch-up. The new lithium chemistries and super-capacitors do not have the natural self-balancing functionality. If allowed to overcharge, the cells can catastrophically fail. Balancing eliminates this weakness by forcing all of the cells to charge to the same cease charging threshold. Balancing also maximizes the potential energy to be recovered during discharge thus increasing the total storage efficiency. This leads to longer per cycle use as well as increased total battery life. Even traditional battery chemistries can benefit from active balancing over the traditional overcharge method.

Cell balancing has traditionally been accomplished with the use of resistive shunts to balance cell voltages evenly. This is accomplished by parasitically draining energy from the cells with the higher state of charge (SOC) to drop them to the level of the cells with a lower SOC. This is rather inefficient as energy in cells with higher a SOC is shunted as heat while energy is continued to be added to the bank as a whole to continue and charge the lower SOC cells. This is known as the dissipative method, and is current practice in the aerospace market as well as small terrestrial battery storage systems.

In one such dissipative balancer the electronics performs cell balancing on each of the cells by means of resistive bypass around the cell. When any cell voltage reaches a predetermined threshold a resistor is placed in parallel with the cell, bypassing about 100 mA. The bypassing terminates when the cell voltage drops below a second lower predetermined voltage. There are a non-trivial amount of components required to accomplish this balancing procedure. This impacts the system twofold, one, the total system reliability, and two, the reduced system efficiency by dissipating power while charging. In a situation with a severely unbalanced bank, charging must periodically cease to allow the stronger cells to drop to the level of the weakest before charging can resume. This represents lost time and energy to be stored. With high quality aerospace batteries the balancing disparities are normally tiny due to cell lot testing and manufacturing needing little to no active balancing. In the commercial world, battery banks are assembled from multiple lots and or venders; thus continuous balancing is necessary.

The commercial world has used two approaches to improve the efficiency of cell balancing. The first is transferring energy from the entire bank as a whole to the cells with lower SOC. This method requires individual switching converters or a ganged fly-back converter to transfer this energy. There is the disadvantage that a dissipative balancer is still needed to address an overcharged cell. The dissipative balancer can be replaced with additional unidirectional converters to remove excess charge and return it to the whole bank.

The second more complex approach actively shuttles energy from the high SOC cells to the lower ones. This is usually accomplished by either transferring energy through the adjacent cells or through an auxiliary transfer bus. This requires some sort of digital control scheme to redistribute the energy when there are multiple steps to move the energy. The energy shuttling is in the form of switched capacitor or inductive charge storage.

These methods require direct galvanic connection of the balancer to each cell in the battery bank. Part count and reduced system reliability become a factor with the more complex balancing methodologies. The active energy shuttling methods represent the most efficient manner for redistributing the energy already contained within the battery bank from the external charger. One producer of high reliability space oriented electronics has such a common share bus balancer but the device is heavy and power hungry.

SUMMARY OF THE INVENTION

It is therefore an object of this invention to provide an improved converter system It is a further object of this invention to provide such an improved converter system which is passively resonant, bidirectional and transports energy across a galvanic barrier.

It is a further object of this invention to provide such an improved converter system which is capable of automatic balancing charging operations.

It is a further object of this invention to provide such an improved converter system which is capable of mirroring voltage.

It is a further object of this invention to provide such an improved converter system which accomplishes the energy transfer quickly, more efficiently without dissipating charge or risking failure, e.g. devices to be charged.

It is a further object of this invention to provide such an improved converter system which is simpler with few components and high reliability.

It is a further object of this invention to provide such an improved converter system which functions to redistribute charge without complex digital control schemes and is smaller, light weight and economical of power.

The invention may be achieved to meet a number of applications e.g. bidirectional energy transfer for cell balancing, isolated dc-dc converter, isolated dc signal transfer, low impedance dc attenuator without loss, ratio metric voltage amplifier. Invention acts as a voltage mirror with a passive resonant bidirectional converter system that transports energy across a galvanic barrier comprising, a converter using at least first and second converter sections, each section including a pair of transfer terminals, a center tapped winding; a chopper circuit interconnected between the center tapped winding and one of the transfer terminals, an inductance feed winding interconnected between the other of the transfer terminals and the center tap and a resonant tank circuit including at least the inductance of the center tap winding and the parasitic capacitance of the chopper circuit for operating the converter section at resonance; the center tapped windings of the first and second converter sections being disposed on a first common winding core and the inductance feed windings of the first and second converter sections being disposed on a second winding core for automatically synchronizing the resonant oscillation of the first and second converter sections and transferring energy between the converter sections until the voltage across the pairs of transfer terminals achieves the turns ratio of the center tapped windings. With more than two converter sections all of the converter sections may have their center tapped windings on the same first common core and their inductance feed winding on the same second core or each pair of converter sections may have center tapped windings on a separate first core and their inductance feed windings on a separate second core.

This invention features a passive resonant bidirectional converter system that transports energy across a galvanic barrier including a converter using at least first and second converter sections, each section including a pair of transfer terminals, a center tapped winding; a chopper circuit interconnected between the center tapped winding and one of the transfer terminals; an inductance feed winding interconnected between the other of the transfer terminals and the center tap and a resonant tank circuit including at least the inductance of the center tap winding and the parasitic capacitance of the chopper circuit for operating the converter section at resonance; the center tapped windings of the first and second converter sections being disposed on a first common winding core and the inductance feed windings of the first and second converter sections being disposed on a second common winding core for automatically synchronizing the resonant oscillation of the first and second converter sections and transferring energy between the converter sections until the voltage across the pairs of transfer terminals achieves the turns ratio of the center tapped windings.

In preferred embodiments the chopper circuit may include a flip-flop circuit. The flip-flop circuit may include a pair of semiconductors with their control electrodes cross-connected to drive the semiconductors to operate out of phase with each other. The semiconductors may be MOSFETs with their gates cross-connected. The center tapped windings may have the same number of turns. The center tapped windings may have a different number of turns. There may be more than two converter sections with all of their center tapped windings disposed on the same first common core and all of the inductance feed windings disposed on a second common core. The first common core may be an air core. The second common core may be an air core. The first common core may be an iron core. The second common core may be an iron core. There may be a number of paired converter sections, the center tapped winding of each of the paired converter sections may be disposed on the same individual winding core and the inductance feed windings of each of the paired converter sections may both be disposed on the same individual inductance feed winding core. One pair of transfer terminals of each of the paired converter sections may be connected to a common power transfer bus. One of the common power transfer buses may be interconnected with a switching circuit for selectively, individually monitoring the voltage at each paired converter section. The flip-flop circuit outputs may be 180° out of phase and have a 50% duty cycle. The semiconductors may be cross connected through attenuator components.

This invention also features a passive resonant automatically balanced charging converter system including a converter using at least first and second converter sections, each section including a pair of transfer terminals, each pair for connection to a device to be charged; a center tapped winding; a chopper circuit interconnected between the center tapped winding and one of the transfer terminals; an inductance feed winding interconnected between the other of the transfer terminals and the center tap and a resonant tank circuit including at least the inductance of the center tap winding and the parasitic capacitance of the chopper circuit for operating the converter section at resonance; the center tapped windings of the first and second converter sections being disposed on a first common winding core and the inductance feed windings of the first and second converter sections being disposed on a second common winding core for automatically synchronizing the resonant oscillation of the first and second converter sections and transferring energy between the converter sections until the voltage across the pairs of transfer terminals is equal.

In preferred embodiments each chopper circuit may include a flip-flop circuit. The flip-flop circuit may include a pair of semiconductors with their control electrodes cross-connected to drive the semiconductors to operate out of phase with each other. The semiconductors may be MOSFETs with their gates cross-connected. The center tapped windings may have the same number of turns. The center tapped windings may have a different number of turns. There may be more than two converter sections with all of their center tapped windings disposed on the same first common core and all of the inductance feed windings disposed on a second common core. The first common core may be an air core. The second common core may be an air core. The first common core may be an iron core. The second common core may be an iron core There may be a number of paired converter sections, the center tapped winding of each of the paired converter sections being disposed on the same individual winding core and the inductance feed windings of each of the paired converter sections both being disposed on the same individual inductance feed winding core. One pair of transfer terminals of each the paired converter sections may be connected to a common power transfer bus. One of the common power transfer buses may be interconnected with a switching circuit for selectively, individually monitoring the voltage at each paired converter section. The flip-flop circuit outputs may be 180° out of phase and have a 50% duty cycle. The semiconductors may be cross connected through attenuator components.

This invention also features a passive resonant voltage mirror converter including at least first and second converter sections, each section including a pair of transfer terminals, a center tapped winding; a chopper circuit interconnected between the center tapped winding and one of the transfer terminals; an inductance feed winding interconnected between the other of the transfer terminals and the center tap and a resonant tank circuit including at least the inductance of the center tap winding and the parasitic capacitance of the chopper circuit for operating the converter section at resonance; the center tapped windings of the first and second converter sections being disposed on a first common winding core and the inductance feed windings of the first and second converter sections being disposed on a second common winding core for automatically synchronizing the resonant oscillation of the first and second converter sections and transferring energy between the converter sections until the voltage is mirrored across the pairs of transfer terminals.

In preferred embodiments each chopper circuit may include a flip-flop circuit. The flip-flop circuit may include a pair of semiconductors with their control electrodes cross-connected to drive the semiconductors to operate out of phase with each other. The semiconductors may be MOSFETs with their gates cross-connected. The center tapped windings may have the same number of turns. The center tapped windings may have a different number of turns. There may be more than two converter sections with all of their center tapped windings disposed on the same first common core and all of the inductance feed windings disposed on a second common core. The first common core may be an air core. The second common core may be an air core. The first common core may be an iron core. The second common core may be an iron core. There may be a number of paired converter sections, the center tapped winding of each of the paired converter sections may be disposed on the same individual winding core and the inductance feed windings of each of the paired converter sections may both be disposed on the same individual inductance feed winding core. One pair of transfer terminals of each of the paired converter sections may be connected to a common power transfer bus. One of the common power transfer buses may be interconnected with a switching circuit for selectively, individually monitoring the voltage at each paired converter section. The flip-flop circuit outputs may be 180° out of phase and have a 50% duty cycle. The semiconductors may be cross connected through attenuator components.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
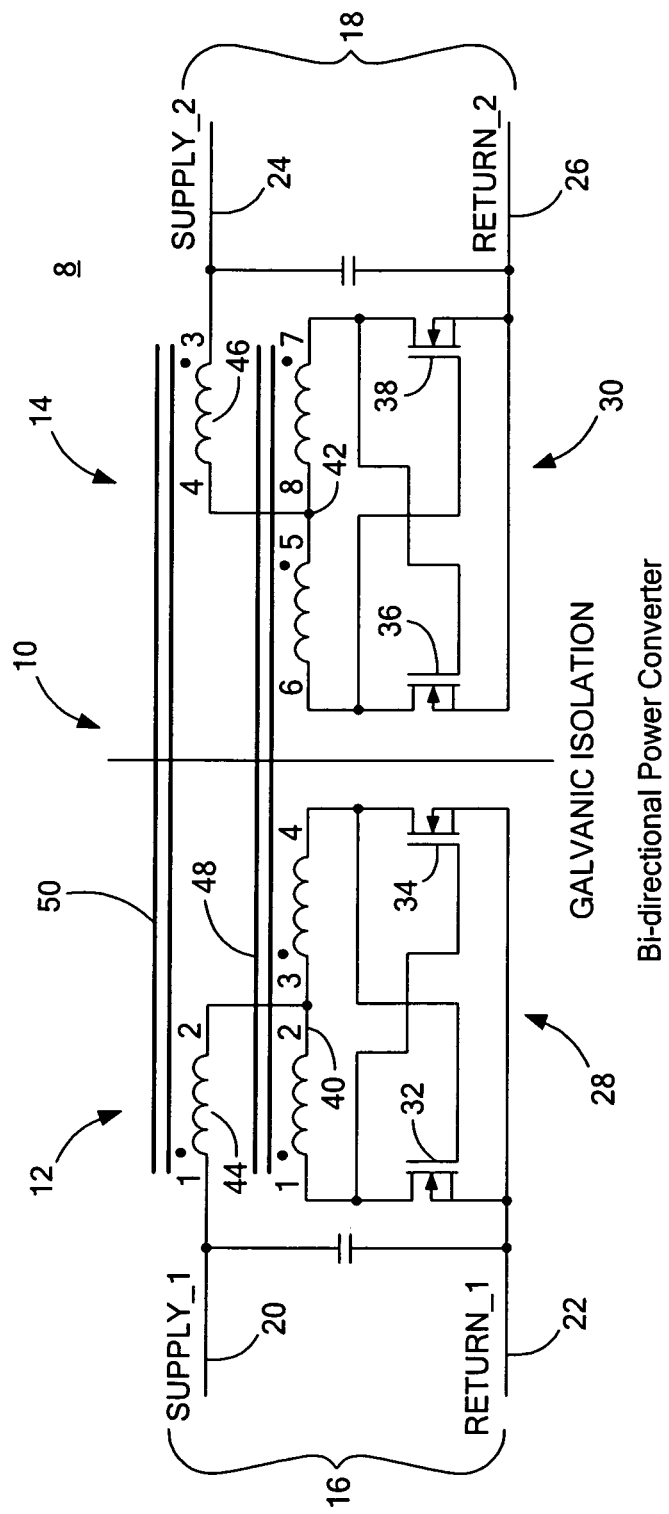
FIG. 1 is a schematic diagram of two sections of a passive resonant bidirectional converter system with galvanic barrier according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

The bidirectional converter according to this invention which has a number of applications including e.g., cell balancing, voltage mirroring, isolated dc-dc converter is achieved with a symmetric input/output design that mirrors the voltage present on one side to the other. The converter uses transformers to isolate the two halves of the converter so the input to output galvanic isolation is limited only by the insulating capacity of the magnetic cores. The magnetic cores may be iron, or other typical core materials including air. The voltage mirroring function exactly reflects the voltage on one side to the other when the turns ratio of the transformers is equal. If the turns ratios are not equal then the voltage mirroring is done equally accurately but in proportion to the turns ratio of the two halves of the transformer. The converter uses a resonant architecture driven by two MOSFETs that flip flop rapidly typically at a frequency of 200 kHz. The MOSFET gates are cross-connected so that they cycle out of phase, typically 180° out of phase with each other. The gate capacitance of the MOSFETs also serves as a capacitance in parallel with the transformer primary windings to form the LC oscillator. The transformer primary is supplied current by means of a center cap connected to a second transformer serving as an inductor. The second transformer serving as an inductor in conjunction with the auto transformer effect of the center tap develops a voltage across the primary to follow the equation $V_{primary} = V_{supply} \times \pi$. A decoupling capacitor across the supply eliminates the contribution of the cabling inductance to the supply inductor. The converter circuit can be duplicated about the two transformers introducing the bi-directional capability.

Converter system 8, FIG. 1, includes such a bidirectional power converter 10 according to this invention including two converter sections 12 and 14. Each section includes a pair of transfer terminals 16 and 18. Transfer terminals 16 include supply terminal 20 and return terminal 22 while transfer terminals 18 include supply terminal 24 and return terminal 26. Each section 12 and 14 includes a chopper circuit 28 and 30 comprising a flip flop circuit using two cross-connected MOSFETs 32, 34, 36 and 38, respectively. Although they are shown directly cross-connected they may as well be cross-connected through attenuator components such as impedances. Each section 12 and 14 includes a center tap winding 40, 42, respectively, which form a part of the primary winding and which are supplied power through inductances 44 and 46, respectively, which in turn form a part of the secondary winding. The primary or center tap windings 40, 42 of both sections 12 and 14 are associated with a first common core 48, while the inductances 44 and 46 are associated with a second common core 50. The gate capacitance of MOSFETs 32, 34, 36 and 38 serve as the capacitance in parallel with the transformer primaries 40, 42 that serve as the LC oscillator. Converter 10 precisely mirrors the voltage between the transfer terminals. Either the voltage at 16 is mirrored at 18 or the voltage at 18 is mirrored at 16. Any slight voltage differential between the two sets of transfer terminals causes the converter to sink current from the highest supply voltage and transfer it to the lower.

This converter is not limited to a single input/output pair. And there are countless applications for it acting as ideal transformer, e.g., isolated dc-dc converters, isolated dc signal transfer, acting as low impedance dc actuators without loss, and bidirectional energy transfer for cell balancing to name a few for example. In a cell balancing application each energy storage cell to be balanced is connected to one converter half, 12 or 14, with all of the converter halves sharing common magnetic cores. The circuit doesn't require any active control because the energy is naturally balanced within the magnetics of the circuit.

Figure 2:
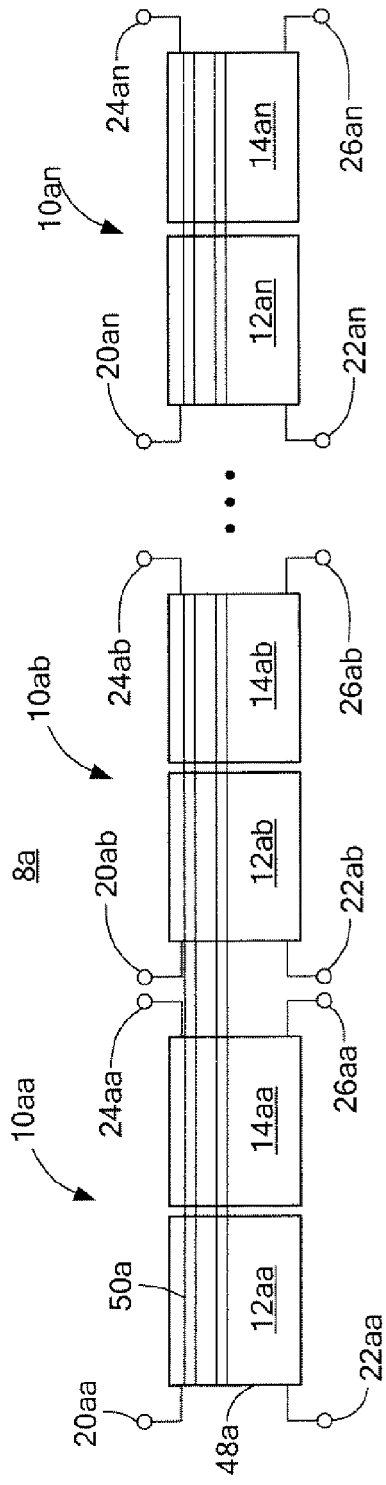
FIG. 2 is a simplified schematic diagram of the converter system of FIG. 1 including a plurality of converters of FIG. 1 all using the same cores.
Figure 3:
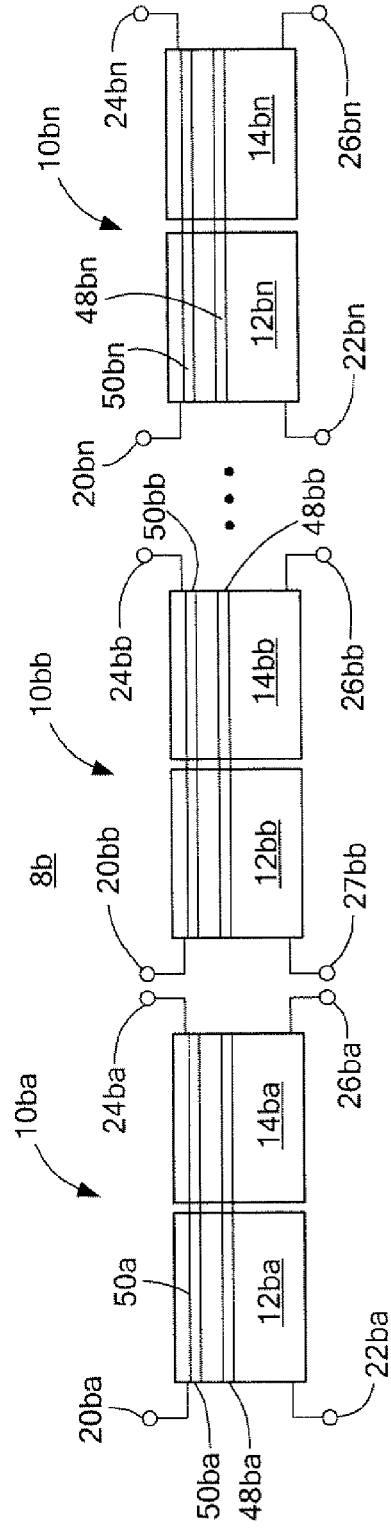
FIG. 3 is a simplified schematic diagram of the converter system including a plurality of converters of FIG. 1 each pair of sections using separate cores.
Figure 4:
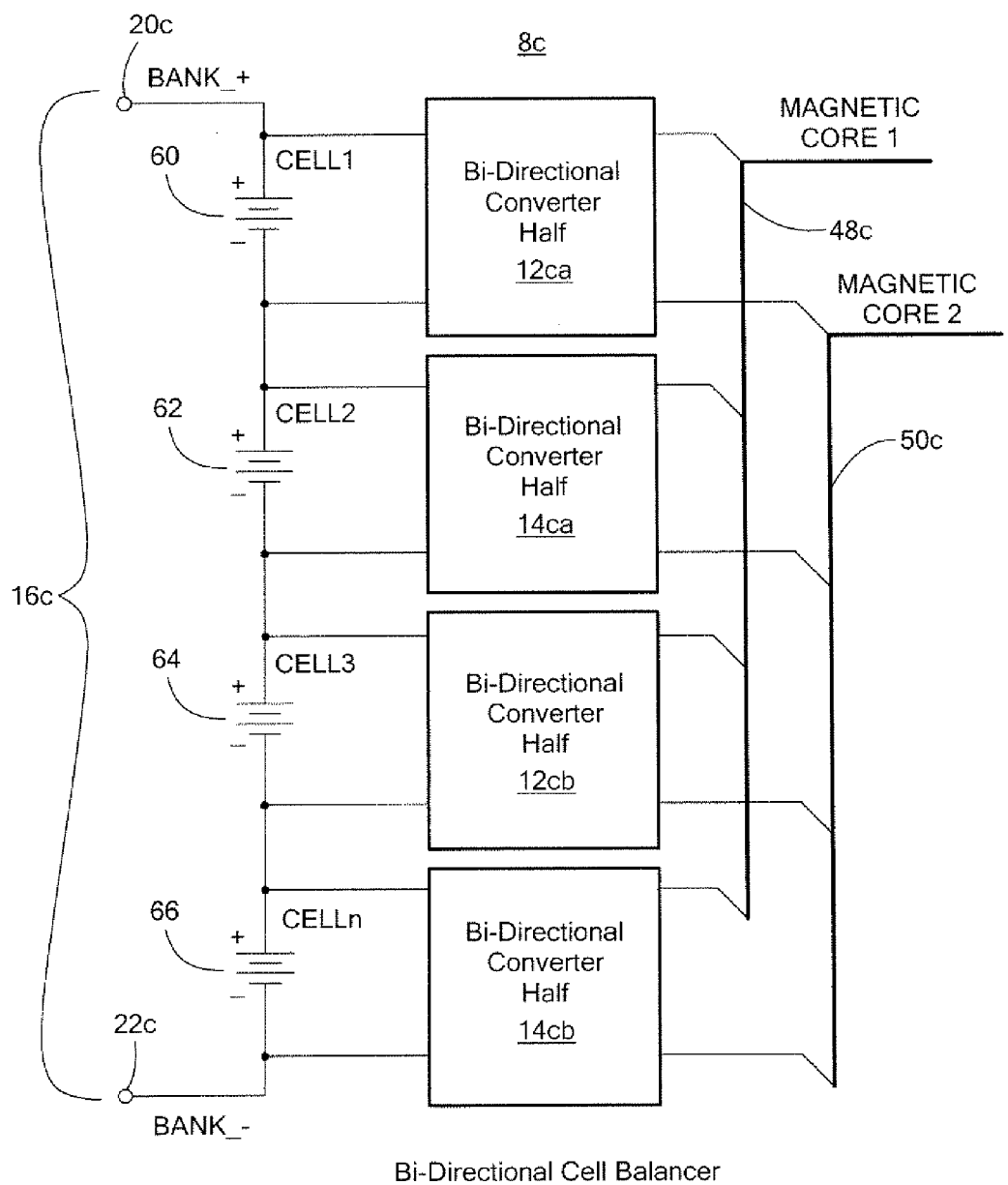
FIG. 4 is a block diagram of a converter system similar to that of FIG. 2 applied as a bidirectional battery cell balancer according to this invention.

Throughout the description like parts have been like numbers and similar parts have been given like numbers with lower case letters. Converter system 8$a$, FIG. 2, according to this invention may include a plurality of converters 10$aa$, 10$ab$ . . . 10$an$ each including a pair of converter sections 12$aa$, 14$aa$; 12$ab$, 14$ab$; 12$an$, 14$an$ wherein all of the primary or center tap windings are disposed on the same common core 48$a$ and all of the secondary inductance feed windings are disposed on a common second core 50$a$. Any number of converters 10, and sections 12, 14 may be assembled in this fashion. In contrast each pair of sections in a converter may be associated with its own common cores. In converter system 8$b$, FIG. 3, each of the converters 10$ba$, 10$bb$, 10$bn$ has its paired converter sections 12$ba$, 14$ba$; 12$bb$, 14$bb$; 12$bn$, 14$bn$; configured with their primary center tap windings on its own separate common core 48$ba$, 48$bb$, 48$bn$, respectively and the secondary inductance feed windings on their own cores 50$ba$, 50$bb$, 50$bn$, respectively. Converter system 8$c$, FIG. 4, illustrates an assemblage of four converter sections 12$ca$, 14$ca$; 12$cb$, 14$cb$; with all of their center tap windings and inductance feed windings disposed on common cores 48$c$, 50$c$, respectively. In this arrangement the transfer terminals 16$c$ including supply terminal 20$c$ and return terminal 22$c$ are connected across the four cells 60, 62, 64 and 66 to be charged by converter sections 12$ca$, 14$ca$; 12$cb$ and 14$cb$; respectively. Each of the four cells had a charge 1.807 v, 1.902 v, 2.004 v and 2.095 v at the outset. The cells were attached to the circuit and the circuit allowed to operate until the cells were balanced within approximately 0.1% voltage matching. Ideally the balance voltage of those cells would be $V_{BALANCED}=(1.8V+1.9V+2.0V+2.1V)/4=1.95V$. Since the converter consumes parasitic energy while operating and is unable to redistribute the energy with zero loss the actual balance voltage when the cells were within 0.1% was 1.937 v. The cell voltages at various times is shown in Table I.

amount of energy remaining after the shuttling as the percentage of the original stored energy. It can be seen from the data that the circuit is extremely efficient. The total quantity of windings that can be practically be wound on a single transformer core can be limiting and the size of the MOSFETs and cores limits the maximum current transfer rate. The circuit impedance and the MOSFET matching set the tolerance for the balancing voltages and MOSFET gate thresholds set the practical minimum at which the circuit will start oscillating without external stimuli for startup. The failure of a single converter can affect the balancing capability of the battery bank, but this can be overcome by adding an auxiliary converter 112 shown in phantom that shares the common magnetic cores: only its input terminals are connected to the overall battery bank voltage. The number of turns for the auxiliary converter on each of the common magnetic cores is equivalent to the number of cells in the bank times the individual cell converter winding ratios. The auxiliary converter in effect will force the bank voltage to be an exact multiple of the individual cell voltage and vice versa. In the event of a single converter failure the bidirectional nature of the remaining converters and the auxiliary converter will insure that the voltage present across the cell with the failed converter is exactly the same as the other cells. Assume for example that the converter that serves to balance cell 2 has failed. The still operating converters by nature of the circuit presented must all have the same voltage. This means that intrinsically cell 1, cell 3, and cell n have a balanced voltage present. The auxiliary converter 112 as described will produce a terminal voltage that is n number of cells times the balanced voltage potential. The auxiliary converter terminal voltage is then attached across the extremes of the bank voltage. Mathematically this means that the voltage present on cell 2 (with the failed converter) will be forced to auxiliary converter potential (n number of cells times the balanced voltage) minus the sum of the individual cell voltages in the string. Since by nature these converters are bidirectional the energy will be redistributed until the cells all reach the balance potential. The bidirectional converter system according to this invention can also be configured to operate with a common power sharing bus to effectively balance the battery bank. In this configuration the need for a single pair of magnetic cores to contain enough windings for all of the converter sections and cells in the bank to be balanced is eliminated. There also is the added convenience that each cell can be monitored as well as balanced without any galvanic connection. By using the voltage

TABLE I

| Time | CELL VOLTAGES | | | | | CELL ENERGY | | | | | Efficiency |
|---|---|---|---|---|---|---|---|---|---|---|---|
| s | 1 (V) | 2 (V) | 3 (V) | 4 (V) | match % | 1 (J) | 2 (J) | 3 (J) | 4 (J) | tot (J) | % |
| 0 | 2.095 | 2.004 | 1.902 | 1.807 | 20.03 | 768.19 | 702.93 | 632.83 | 571.25 | 2675.20 | |
| 390 | 2.015 | 1.985 | 1.917 | 1.887 | 10.08 | 710.86 | 689.29 | 642.99 | 622.91 | 2666.05 | 99.66 |
| 2290 | 1.949 | 1.948 | 1.940 | 1.937 | 1.00 | 665.07 | 663.77 | 658.70 | 656.89 | 2644.44 | 98.85 |
| 3880 | 1.938 | 1.938 | 1.939 | 1.937 | 0.10 | 657.36 | 657.07 | 657.82 | 656.75 | 2629.00 | 98.27 |

Figure 5:
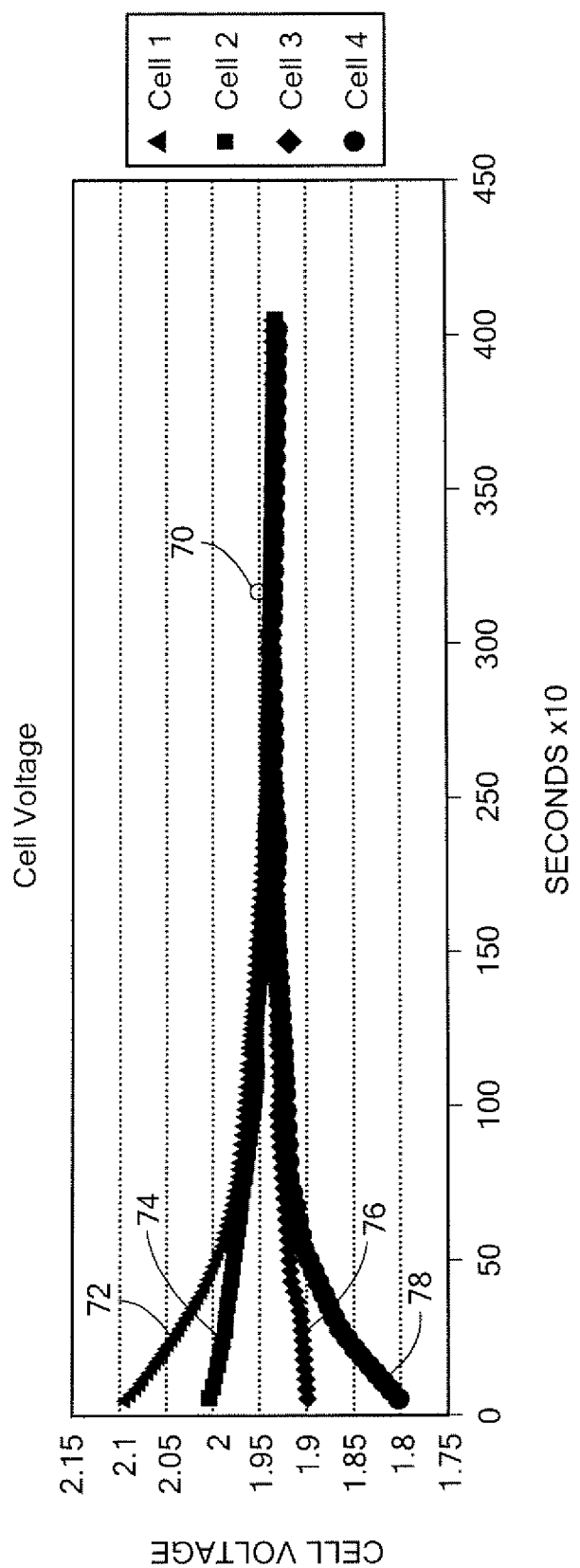
FIG. 5 is a graphical illustration of convergence of cell voltages over time achieved by the converter system of FIG. 4.
Figure 6:
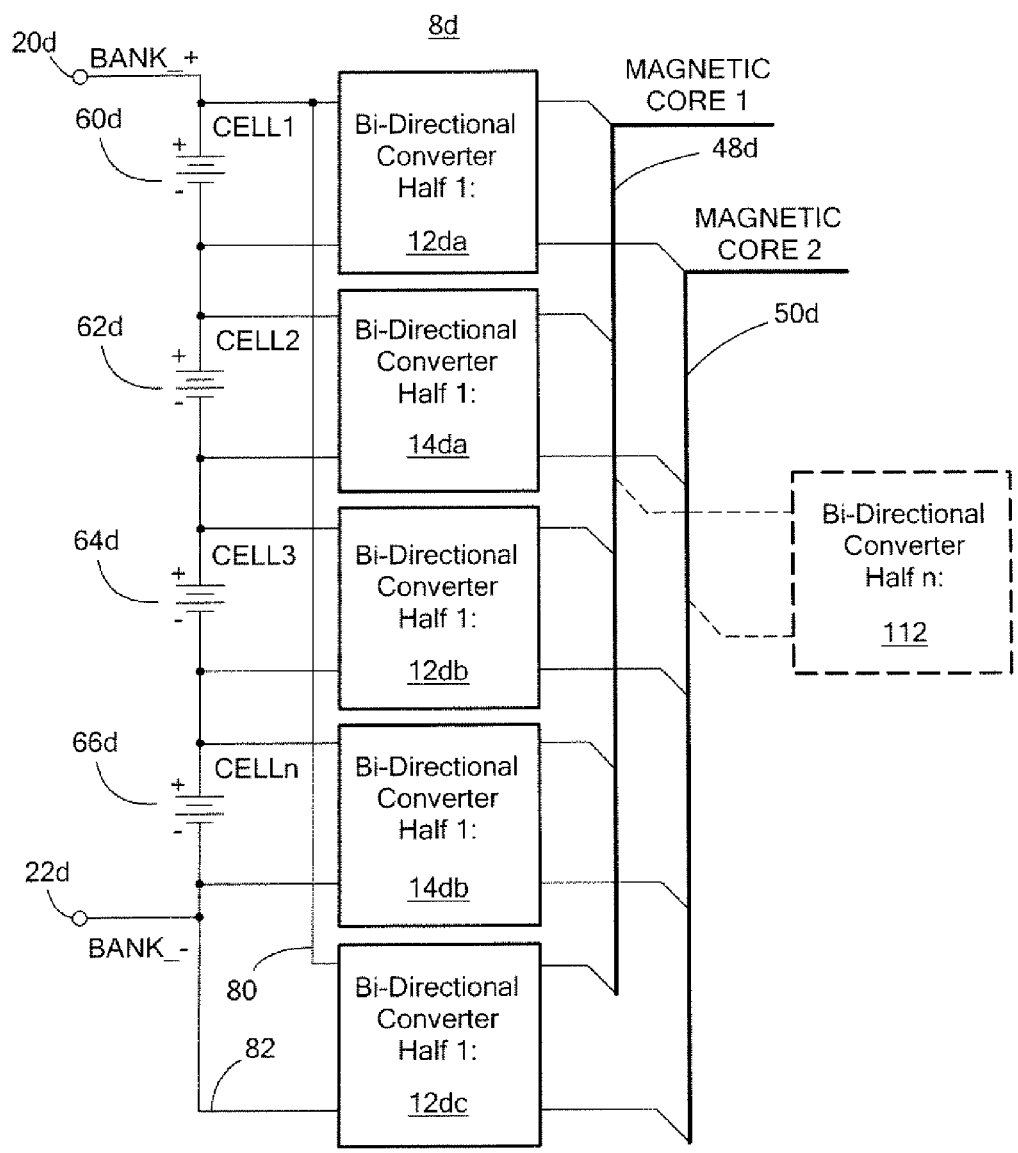
FIG. 6 is a block diagram of a converter system similar to that of FIG. 4 configured with fault tolerance capability.
Figure 7:
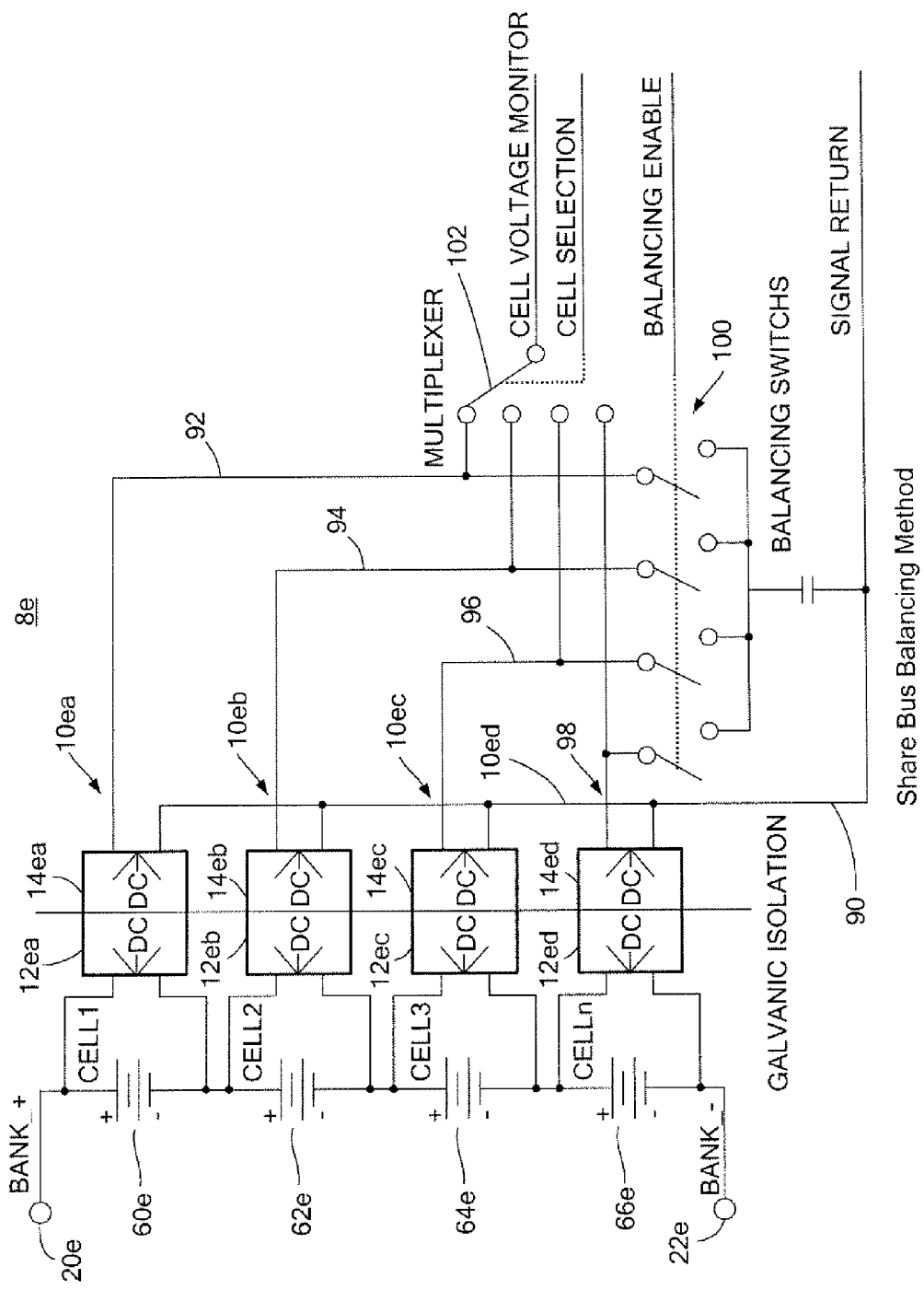
FIG. 7 is a block diagram of a converter system similar to that of FIG. 3 configured to selectively monitor individual cells.
Figure 8:
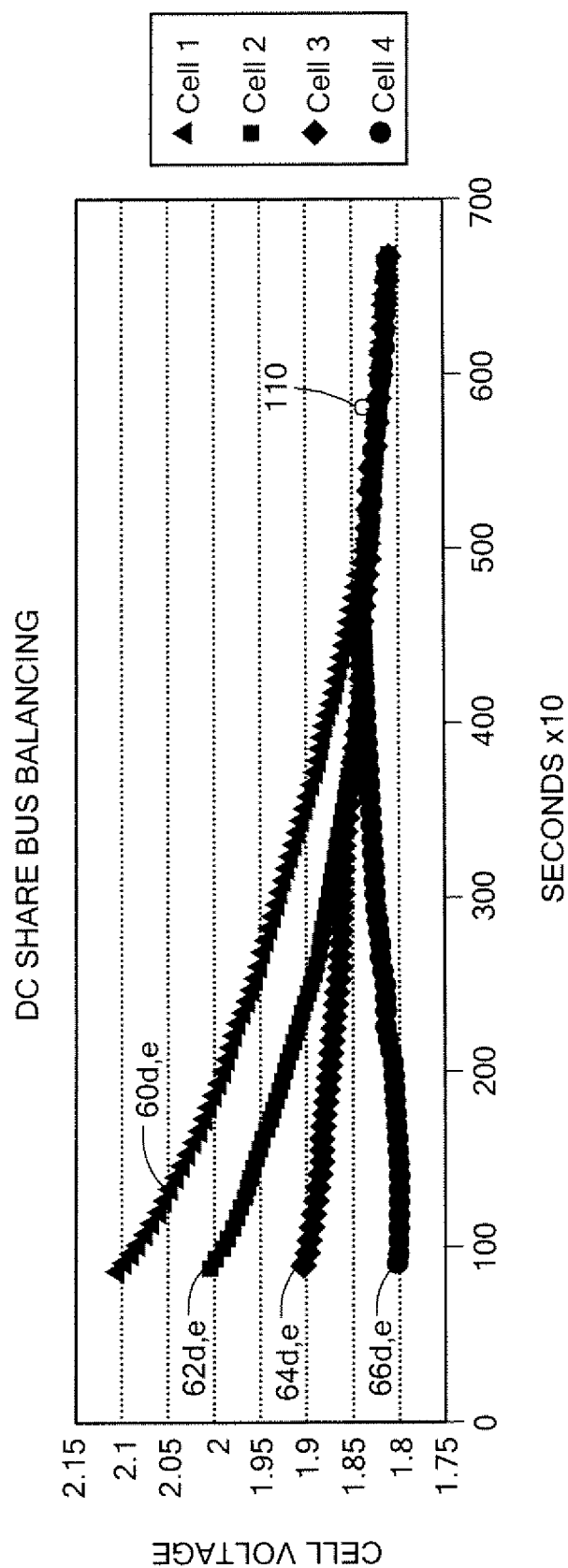
FIG. 8 is a graphical illustration of the convergence of cell voltages over time in the dc bus sharing cell balancing of FIG. 6.

At various times beginning at zero and again at 390 seconds 2,290 and 3,880 seconds the overall efficiency was over 98%. The fast convergence of the cell voltages is depicted in the graph of FIG. 5 where as soon as 3000 seconds, 70, FIG. 5, the cell voltages 72, 74, 76, 78 of the four cells 60, 62, 64, 66 were very closely matched. One striking advantage to this invention used in cell balancing is the conservation of energy that is currently stored. In this example the balancing shuttled the stored energy from the cells with the higher state of charge to the lower ones. The balancing efficiency is computed as the mirroring capabilities of the bidirectional converter system, the traditional differential amplifier voltage monitors are eliminated further reducing quiescent power draw and part count. To sample the voltage of each cell, all balancing converters are temporarily disconnected from the common share bus thereby allowing each to be polled by the monitoring circuitry. The scalability of such a balancing system is quite impressive as each cell to be balanced merely needs to have a bi-directional converter and the requisite share bus connections. As with the common cores method; a single balancer failure can be compensated for by the addition of a converter operating for the battery bank as a whole. Such a system 8e is shown in FIG. 7 where sections 12ea-12ed of converters 10ea-10ed are connected cells to be charged 60e-66e, while the second sections 14ea-14ed of converters 10ea-10ed are connected to a common bus 90 and to individual monitoring lines 92, 94, 96, and 98. Balancing is accomplished by closing switches 100. Cell voltage monitoring is accomplished by selectively closing switch 102 to one of lines 92, 94, 96, 98 whose cell voltage is to be monitored while opening the associated one of switches 100. The dc share bus balancing accomplished by FIG. 6 and/or FIG. 7 is depicted in FIG. 8 where the cells 60d,e, 62d,e, 64d,e, and 66d,e are shown as converging closely in under 6,000 seconds approximately at 110. The convergence of the cell voltages and their match percentage over time as well as the efficiency is shown in Table II.

TABLE II

| TIME | CELL VOLTAGES | | | | | CELL ENERGY | | | | | EFFICIENCY |
|---|---|---|---|---|---|---|---|---|---|---|---|
| (s) | 1 (V) | 2 (V) | 3 (V) | 4 (V) | MATCH % | 1 (J) | 2 (J) | 3 (J) | 4 (J) | TOT (J) | % |
| 0 | 2.1073 | 2.0015 | 1.9002 | 1.7974 | 21.07 | 777.2 | 701.0 | 631.9 | 565.4 | 2675.4 | |
| 1470 | 1.9642 | 1.8972 | 1.8663 | 1.8063 | 10.02 | 675.2 | 629.9 | 609.5 | 571.0 | 2485.6 | 92.90 |
| 4010 | 1.8346 | 1.8236 | 1.8232 | 1.8205 | 1.00 | 589.0 | 582.0 | 581.7 | 580.0 | 2332.7 | 87.19 |
| 5790 | 1.7973 | 1.7964 | 1.7967 | 1.7958 | 0.10 | 565.3 | 564.7 | 564.9 | 564.4 | 2259.3 | 84.45 |

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A passive resonant bidirectional converter system that transports energy across a galvanic barrier comprising:
   a converter using at least first and second converter sections, each section including a pair of transfer terminals, a center tapped winding; a chopper circuit interconnected between said center tapped winding and one of said transfer terminals; an inductance feed winding interconnected between the other of said transfer terminals and said center tap and a resonant tank circuit including at least the inductance of said center tap winding and the parasitic capacitance of said chopper circuit for operating said converter section at resonance; the center tapped windings of said first and second converter sections being disposed on a first common winding core and said inductance feed windings of said first and second converter sections being disposed on a second common winding core for automatically synchronizing the resonant oscillation of said first and second converter sections and transferring energy between said converter sections until the voltage across the pairs of transfer terminals achieves the turns ratio of the center tapped windings.

2. The passive resonant bidirectional converter system of claim 1 in which each said chopper circuit includes a flip-flop circuit.

3. The passive resonant bidirectional converter system of claim 1 in which said flip-flop circuit includes a pair of semiconductors with their control electrodes cross-connected to drive the semiconductors to operate out of phase with each other.

4. The passive resonant bidirectional converter system of claim 1 in which said semiconductors are MOSFETs with their gates cross-connected.

5. The passive resonant bidirectional converter system of claim 1 in which said center tapped windings have the same number of turns.

6. The passive resonant bidirectional converter system of claim 1 in which said center tapped windings have a different number of turns.

7. The passive resonant bidirectional converter system of claim 1 in which there are more than two converter sections with all of their center tapped windings disposed on the same first common core and all of the inductance feed windings disposed on a second common core.

8. The passive resonant bidirectional converter system of claim 1 in which said first common core is an air core.

9. The passive resonant bidirectional converter system of claim 1 in which said second common core is an air core.

10. The passive resonant bidirectional converter system of claim 1 in which said first common core is an iron core.

11. The passive resonant bidirectional converter system of claim 1 in which said second common core is an iron core.

12. The passive resonant bidirectional converter system of claim 1 in which there are a number of paired converter sections, the center tapped winding of each of the paired converter sections being disposed on the same individual winding core and the inductance feed windings of each of the paired converter sections both being disposed on the same individual inductance feed winding core.

13. The passive resonant bidirectional converter system of claim 12 in which one pair of transfer terminals of each said paired converter sections are connected to a common power transfer bus.

14. The passive resonant bidirectional converter system of claim 13 in which one of said common power transfer buses is interconnected with a switching circuit for selectively, individually monitoring the voltage at each paired converter section.

15. The passive resonant bidirectional converter system of claim 2 in which said flip-flop circuit outputs are 180° out of phase and have a 50% duty cycle.

16. The passive resonant bidirectional converter system of claim 1 in which said semiconductors are cross connected through attenuator components.

17. A passive resonant automatically balanced charging converter system comprising:
a converter using at least first and second converter sections, each section including a pair of transfer terminals, each pair for connection to a device to be charged; a center tapped winding; a chopper circuit interconnected between said center tapped winding and one of said transfer terminals; an inductance feed winding interconnected between the other of said transfer terminals and said center tap and a resonant tank circuit including at least the inductance of said center tap winding and the parasitic capacitance of said chopper circuit for operating said converter section at resonance; the center tapped windings of said first and second converter sections being disposed on a first common winding core and said inductance feed windings of said first and second converter sections being disposed on a second common winding core for automatically synchronizing the resonant oscillation of said first and second converter sections and transferring energy between said converter sections until the voltage across the pairs of transfer terminals is equal.

18. The passive resonant bidirectional converter system of claim 17 in which each said chopper circuit includes a flip-flop circuit.

19. The passive resonant bidirectional converter system of claim 17 in which said flip-flop circuit includes a pair of semiconductors with their control electrodes cross-connected to drive the semiconductors to operate out of phase with each other.

20. The passive resonant bidirectional converter system of claim 17 in which said semiconductors are MOSFETs with their gates cross-connected.

21. The passive resonant bidirectional converter system of claim 17 in which said center tapped windings have the same number of turns.

22. The passive resonant bidirectional converter system of claim 17 in which said center tapped windings have a different number of turns.

23. The passive resonant bidirectional converter system of claim 17 in which there are more than two converter sections with all of their center tapped windings disposed on the same first common core and all of the inductance feed windings disposed on a second common core.

24. The passive resonant bidirectional converter system of claim 17 in which said first common core is an air core.

25. The passive resonant bidirectional converter system of claim 17 in which said second common core is an air core.

26. The passive resonant bidirectional converter system of claim 17 in which said first common core is an iron core.

27. The passive resonant bidirectional converter system of claim 17 in which said second common core is an iron core.

28. The passive resonant bidirectional converter system of claim 17 in which there are a number of paired converter sections, the center tapped winding of each of the paired converter sections being disposed on the same individual winding core and the inductance feed windings of each of the paired converter sections both being disposed on the same individual inductance feed winding core.

29. The passive resonant bidirectional converter system of claim 28 in which one pair of transfer terminals of each said paired converter sections are connected to a common power transfer bus.

30. The passive resonant bidirectional converter system of claim 29, in which one of said common power transfer buses is interconnected with a switching circuit for selectively, individually monitoring the voltage at each paired converter section.

31. The passive resonant bidirectional converter system of claim 18 in which said flip-flop circuit outputs are 180° out of phase and have a 50% duty cycle.

32. The passive resonant bidirectional converter system of claim 17 in which said semiconductors are cross connected through attenuator components.

33. A passive resonant voltage mirror converter comprising:
at least first and second converter sections, each section including a pair of transfer terminals, a center tapped winding; a chopper circuit interconnected between said center tapped winding and one of said transfer terminals; an inductance feed winding interconnected between the other of said transfer terminals and said center tap and a resonant tank circuit including at least the inductance of said center tap winding and the parasitic capacitance of said chopper circuit for operating said converter section at resonance; the center tapped windings of said first and second converter sections being disposed on a first common winding core and said inductance feed windings of said first and second converter sections being disposed on a second common winding core for automatically synchronizing the resonant oscillation of said first and second converter sections and transferring energy between said converter sections until the voltage is mirrored across the pairs of transfer terminals.

34. The passive resonant bidirectional converter system of claim 33 in which each said chopper circuit includes a flip-flop circuit.

35. The passive resonant bidirectional converter system of claim 33 in which said flip-flop circuit includes a pair of semiconductors with their control electrodes cross-connected to drive the semiconductors to operate out of phase with each other.

36. The passive resonant bidirectional converter system of claim 33 in which said semiconductors are MOSFETs with their gates cross-connected.

37. The passive resonant bidirectional converter system of claim 33 in which said center tapped windings have the same number of turns.

38. The passive resonant bidirectional converter system of claim 33 in which said center tapped windings have a different number of turns.

39. The passive resonant bidirectional converter system of claim 33 in which there are more than two converter sections with all of their center tapped windings disposed on the same first common core and all of the inductance feed windings disposed on a second common core.

40. The passive resonant bidirectional converter system of claim 33 in which said first common core is an air core.

41. The passive resonant bidirectional converter system of claim 33 in which said second common core is an air core.

42. The passive resonant bidirectional converter system of claim 33 in which said first common core is an iron core.

43. The passive resonant bidirectional converter system of claim 33 in which said second common core is an iron core.

44. The passive resonant bidirectional converter system of claim 33 in which there are a number of paired converter sections, the center tapped winding of each of the paired converter sections being disposed on the same individual winding core and the inductance feed windings of each of the paired converter sections both being disposed on the same individual inductance feed winding core.

45. The passive resonant bidirectional converter system of claim 44 in which one pair of transfer terminals of each said paired converter sections are connected to a common power transfer bus.

46. The passive resonant bidirectional converter system of claim 45 in which one of said common power transfer buses is interconnected with a switching circuit for selectively, individually monitoring the voltage at each paired converter section.

47. The passive resonant bidirectional converter system of claim 34 in which said flip-flop circuit outputs are 180° out of phase and have a 50% duty cycle.

48. The passive resonant bidirectional converter system of claim 33 in which said semiconductors are cross connected through attenuator components.

* * * * *